Patented May 13, 1952

2,596,804

UNITED STATES PATENT OFFICE 2,596,804

METHOD FOR THE PREPARATION OF DIACYL CYANIDES

Alan E. Ardis, Cuyahoga Falls, Ohio, assignor to The B. F. Goodrich Company, New York, N. Y., a corporation of New York No Drawing. Application December 5, 1950, Serial No. 199,351

7 Claims. (Cl. 260—465.4)

This invention relates to a novel method for the preparation of diacyl cyanides and particularly diacetyl cyanide (also known as 1-acetoxy-1,1-dicyano ethane), which method involves the vapor phase, catalytic reaction of acetic anhydride with hydrogen cyanide.

Diacyl cyanides have become of considerable industrial importance because of the fact that they can be pyrolyzed to give monomeric nitriles, which in turn are of great value in the preparation of synthetic resins particularly useful in making excellent filaments and films. Vinylidene cyanide, prepared by the pyrolysis of 1-acetoxy-1,1-dicyano ethane, is especially useful for this purpose. The pyrolysis of 1-acetoxy-1,1-dicyano ethane to give vinylidene cyanide is described in U. S. Patent 2,476,270.

Heretofore, 1-acetoxy-1,1-dicyano ethane has been prepared by the liquid phase, catalytic reaction of ketene with hydrogen cyanide. This compound as well as other diacyl cyanides has been obtained in minute quantities as an impurity in monomolecular acyl cyanides obtained by the vapor phase reaction of carboxylic acid anhydrides with hydrogen cyanide. However, the quantity of diacyl cyanides obtained by this procedure is so small as to render such process useless from a practical standpoint for preparing the desired diacyl cyanides.

Accordingly, it is an object of this invention to prepare pure diacyl cyanides, especially 1-acetoxy-1,1-dicyano ethane, economically and in high yields from easily procurable raw materials. Other objects will be apparent from the description of the invention hereinbelow.

It has now been discovered that the above and other objects are attained by reacting acetic anhydride and hydrogen cyanide, both of which are low cost raw materials, in the vapor phase and in the presence of a surface-active material and a tertiary amine catalyst. By carrying out the reaction in this manner excellent yields of high purity diacyl cyanides and especially 1-acetoxy-1,1-dicyano ethane are economically obtained.

The vapor phase reaction of acetic anhydride with hydrogen cyanide in the presence of a surface active material and a tertiary amine catalyst proceeds substantially according to the following equation:

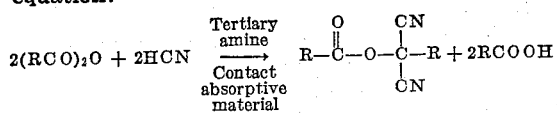

wherein R is an alkyl radical.

The carboxylic acid anhydrides which are reacted with hydrogen cyanide in accordance with the present invention include both the aliphatic and aromatic carboxylic acid anhydrides, such as acetic anhydride, propionic anhydride, butyric anhydride, isobutyric anhydride, succinic anhydride, adipic anhydride, sebacic anhydride, glutaric anhydride, suberic anhydride, benzoic anhydride, phthalic anhydride, and the like. Mixed carboxylic acid anhydrides may also be utilized. The especially preferred anhydrides for use in the present process are those in which the radical R above is an alkyl radical containing from 1 to 6 carbon atoms.

The surface-active material which is used according to the present invention is preferably an activated oxide of aluminum, commonly known as alumina. Other materials which may also be utilized include contact type catalysts such as titania, titania gel, alumina gel, silica gel, activated and unactivated forms of carbon and the like. Many of these materials, including the activated alumina, are known as absorptive contact catalysts since they possess the property of absorbing large quantities of gases.

No special reaction procedures are necessary in carrying out the reaction of the present invention. Thus, the reaction may be effected simply by passing vapors of the carboxylic acid anhydride, hydrogen cyanide and the tertiary amine, over the heated catalyst bed. One particularly desirable expedient, although not a critical expedient, comprises first forming a solution of the tertiary amine catalyst in the carboxylic acid anhydride, vaporizing the solution and subsequently passing the vapors together with the hydrogen cyanide over the catalyst bed. It is also desirable that the hydrogen cyanide utilized be substantially anhydrous, since any water present may tend to reduce the yield of the desired diacyl cyanide.

The effluent gases which pass from the catalyst chamber include the desired diacyl cyanide, together with some unconverted reactants, catalyst and by-products. These gases may be utilized in other processes, as such, but are desirably condensed and the diacyl cyanide recovered from the resulting condensate by distillation, preferably at reduced pressures, or by other common means of separation. It is important that the catalyst be neutralized before the distillation process is carried out in order that the formation of the monomolecular acyl cyanide will be suppressed.

The temperature and pressure at which the reaction is conducted may be varied considerably. In general, it may be stated that temperatures in the range of 150° C. to 600° C. are operative, with a particularly preferred range being from 225° C. to 370° C. The reaction is ordinarily carried out at substantially atmospheric pressures, although higher pressures and sub-atmospheric pressures are also operative. Dilution of the reactants with an inert gas such as nitrogen, helium or the like permits the attainment of subatmospheric partial pressures, and also facilitates mixing of the reactants and passage of the reactants over the catalyst bed.

As will be seen from the above reaction equation, 2 moles of the carboxylic acid anhydride are stoichiometrically required to react with 2 moles of hydrogen cyanide to form the diacyl cyanide. However, the two reactants may be brought together in any desired ratio; in fact, it has been discovered that highest yields of diacyl cyanides are obtained when a slight excess of hydrogen cyanide, for example, about 2 moles of hydrogen cyanide for each mole of carboxylic acid anhydride, is present.

Any tertiary amine may be utilized as the catalyst for the reaction of the present invention. By tertiary amine is meant any amine in which all of the hydrogens attached to the amino nitrogen atom have been replaced by a hydrocarbon structure. Typical tertiary amines which may be utilized as catalysts include the tertiary aliphatic, aromatic and heterocyclic amines such as trimethyl amine, triethyl amine, tributyl amine, tertiary amyl amine, trihexyl amine, tribenzyl amine, triphenyl amine, pyridine, picolines, N-ethyl piperidine, eucatropine, 1-methyl-3-ethyl piperidine, dimethyl-o-toluidine, N-diethyl aniline and the like. The quantity of tertiary amine catalyst which is utilized is not critical and may be varied considerably; however, ordinarily, about 0.5 to 5% by weight, based on the weight of the carboxylic acid anhydride, is utilized, although larger or smaller amounts may be utilized if so desired.

The following examples are intended to illustrate the preparation of diacyl cyanides according to the method of this invention, but are not to be construed as a limitation upon the scope thereof, for there are, of course, numerous possible variations and modifications. In the examples all parts are by weight.

*Example I*

1-acetoxy-1,1-dicyano ethane is prepared by passing hydrogen cyanide and vapors of a solution of triethyl amine in acetic anhydride over a heated bed of activated alumina. The alumina is placed in a vertical tube and the hydrogen cyanide passed through the tube at a uniform rate of 0.85 mole per hour the tube being maintained at a temperature of 280°–295° C. 17.8 parts of the tertiary amine-acetic anhydride solution (prepared by dissolving 8 parts of triethyl amine in 100 parts of 90% acetic anhydride) are vaporized and passed through the tube simultaneously with the hydrogen cyanide at a uniform rate for the period of an hour. The effluent gases are condensed and neutralized with 1.8 parts of sulfuric acid and are distilled to give 4.5 parts of 1-acetoxy-1,1-dicyano ethane which represents a conversion of 44% based on the amount of acetic anhydride utilized.

*Examples II and III*

Two reactions are carried out at a temperature of about 300° C. utilizing 40 parts by weight of alumina packing and 2% by weight (based on the weight of acetic anhydride) of triethyl amine as the catalyst. The ratio of hydrogen cyanide to acetic anhydride is varied to determine its effect upon conversion. In the first run the molar ratio of hydrogen cyanide to acetic anhydride is 2.68 to 1 and in the second run the molar ratio is 4.3 to 1. The reaction product is treated as in Example I and the per cent conversion obtained in the two runs is 41% and 53%, respectively.

*Example IV*

Example I is repeated except that 2% by weight of dry pyridine is utilized as the catalyst. 7.5 parts of diacetyl cyanide, representing a conversion of 63%, are obtained.

*Examples V and VI*

In order to determine the effect of temperature on conversion, runs were made as follows: a catalyst tube is packed with 30 parts by weight of 1/8 inch pellets of activated alumina catalyst. Hydrogen cyanide is passed through the tube at a uniform rate of about 1.2 mole per hour. In each run 21.6 parts of 90% acetic anhydride containing 2% by weight of triethyl amine are added to the catalyst tube over a period of 1 hour. In the first run a temperature of 290° C. is used and 6.5 parts of 1-acetoxy-1,1-dicyano ethane, which represents a 50% conversion, are recovered; in the second run a temperature of 220° C. is used and 40 parts by weight of 1-acetoxy-1,1-dicyano ethane, which represents a 31% conversion, are recovered.

*Example VII*

Example I was repeated passing 0.85 mol of hydrogen cyanide and 0.2 mol of acetic anhydride containing 2% of triethyl amine per hour through the catalyst tube at 270° C. When the product was distilled, 17 grams of forerun containing 35% of acetic anhydride and 62% of acetic acid, and 9 grams of 1-acetoxy-1,1-dicyano ethane were recovered, representing a 71% conversion and 92% yield based on the acetic anhydride.

Moreover, when the above examples are repeated using other of the surface-active materials listed hereinabove or utilizing other of the carboxylic acid anhydrides, diacyl cyanides are again obtained in good yield. Diacyl cyanides are also obtained in good yields when the reactants are passed over the catalyst at different molar ratios or at other temperatures in the range of 150° C. to 600° C.

Besides being useful in the preparation of monomeric dinitriles, the diacyl cyanides prepared according to the method of this invention are also useful for many other purposes. For example, they possess insecticidal, fungicidal and herbicidal properties as well as being valuable intermediates in the preparation of other chemical compounds.

Although specific examples of the invention have been herein described, it is not intended to limit the invention solely thereto, but to include all of the variations and modifications falling within the spirit and scope of the appended claims.

I claim:

1. The method which comprises bringing together a carboxylic acid anhydride and hydrogen cyanide in the vapor phase in the presence of an absorptive contact material and a tertiary amine catalyst, whereupon chemical reaction occurs between said carboxylic acid anhydride and said hydrogen cyanide, thereby to obtain a diacyl cyanide.

2. The method which comprises bringing together a carboxylic acid anhydride and hydrogen cyanide in the vapor phase at a temperature of from 150° C. to 600° C. in the presence of an absorptive contact material and a tertiary amine catalyst, whereupon chemical reaction occurs between said carboxylic acid anhydride and said hydrogen cyanide, thereby to obtain a diacyl cyanide.

3. The method which comprises bringing together a carboxylic acid anhydride of the structure (RCO)₂O, wherein R is a lower alkyl radical, and hydrogen cyanide in the vapor phase at a temperature of from 150° C. to 600° C., in the presence of an absorptive contact material and a tertary amine catalyst, whereupon chemical reaction occurs between said carboxylic acid anhydride and said hydrogen cyanide, and then neutralizing said tertiary amine catalyst, thereby to obtain a diacyl cyanide of the structure

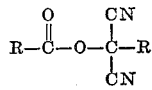

wherein each R has the same significance as above.

4. The method which comprises bringing together acetic anhydride and hydrogen cyanide in the vapor phase at a temperature of from 150° C. to 600° C., in the presence of an absorptive contact material and a tertiary amine catalyst, whereupon chemical reaction occurs between said acetic anhydride and said hydrogen cyanide, and then neutralizing said tertiary amine catalyst, thereby to obtain diacetyl cyanide.

5. The method which comprises bringing together acetic anhydride and hydrogen cyanide in the vapor phase at a temperature of from 225° C. to 370° C., in the presence of an absorptive contact material and a tertiary amine catalyst, whereupon chemical reaction occurs between said acetic anhydride and said hydrogen cyanide, and then neutralizing said tertiary amine catalyst, thereby to obtain diacetyl cyanide.

6. The method of claim 4 wherein the absorptive contact material is activated alumina and the tertiary amine catalyst is triethyl amine.

7. The method which comprises bringing together acetic anhydride and hydrogen cyanide in the vapor phase at a temperature of from 225° C. to 370° C., in the presence of activated alumina and a triethyl amine catalyst, whereupon chemical reaction occurs between said acetic anhydride and said hydrogen cyanide, neutralizing said tertiary amine catalyst with sulfuric acid, and then distilling the resulting reaction mixture to recover diacetyl cyanide.

ALAN E. ARDIS.

REFERENCES CITED

The following references are of record in the file of this patent:

UNITED STATES PATENTS

| Number | Name | Date |
|---|---|---|
| 2,395,930 | Johnston et al. | Mar. 5, 1946 |
| 2,396,201 | Ray | Mar. 5, 1946 |
| 2,426,014 | Gresham | Aug. 19, 1947 |